United States Patent
Kessler et al.

(10) Patent No.: US 8,458,403 B2
(45) Date of Patent: Jun. 4, 2013

(54) ARCHITECTURE AND METHOD FOR CACHE-BASED CHECKPOINTING AND ROLLBACK

(75) Inventors: David J. Kessler, Tampa, FL (US); David R. Bueno, Cambridge, FL (US); David Paul Campagna, St Petersburg, FL (US)

(73) Assignee: Honeywell International Inc., Morristown, NJ (US)

(*) Notice: Subject to any disclaimer, the term of this patent is extended or adjusted under 35 U.S.C. 154(b) by 862 days.

(21) Appl. No.: 12/625,209

(22) Filed: Nov. 24, 2009

(65) Prior Publication Data

US 2011/0125968 A1    May 26, 2011

(51) Int. Cl.
G06F 12/00 (2006.01)
G06F 11/00 (2006.01)

(52) U.S. Cl.
USPC .............. 711/123; 711/143; 711/E12.001; 714/15

(58) Field of Classification Search
None
See application file for complete search history.

(56) References Cited

U.S. PATENT DOCUMENTS

| | | | |
|---|---|---|---|
| 5,269,017 A | 12/1993 | Hayden | |
| 5,568,380 A | 10/1996 | Brodnax et al. | |
| 5,907,673 A | 5/1999 | Hirayama et al. | |
| 6,154,847 A | 11/2000 | Schofield et al. | |
| 6,199,055 B1 | 3/2001 | Kara et al. | |
| 6,202,149 B1 | 3/2001 | Hedegard | |
| 6,308,287 B1 | 10/2001 | Mitchell et al. | |
| 6,519,712 B1 | 2/2003 | Kim et al. | |
| 6,820,216 B2 | 11/2004 | Cmelik | |
| 6,915,417 B2 | 7/2005 | Stein | |
| 7,027,064 B2 | 4/2006 | Lavelle et al. | |
| 7,117,391 B1 | 10/2006 | Hornick | |
| 7,188,273 B2 | 3/2007 | Allen et al. | |
| 7,191,292 B2 | 3/2007 | Chaudhry et al. | |
| 7,305,675 B1 | 12/2007 | Gulick | |
| 7,536,591 B2 | 5/2009 | Varadarajan | |
| 7,562,263 B1 | 7/2009 | Engelbrecht | |
| 7,574,709 B2 | 8/2009 | Erlingsson | |
| 7,581,090 B2 | 8/2009 | Miyake | |
| 7,930,684 B2 | 4/2011 | Roeck | |
| 2001/0027502 A1 | 10/2001 | Bronson | |
| 2003/0078933 A1 | 4/2003 | Gara et al. | |
| 2004/0260678 A1 | 12/2004 | Verbowski et al. | |
| 2007/0174484 A1 | 7/2007 | Lussier et al. | |
| 2007/0276879 A1 | 11/2007 | Rothman et al. | |
| 2008/0016393 A1* | 1/2008 | Bose et al. ............... 714/8 |
| 2008/0059834 A1 | 3/2008 | Erstad | |
| 2008/0244544 A1 | 10/2008 | Neelakantam et al. | |
| 2009/0327807 A1 | 12/2009 | Varadarajan | |

* cited by examiner

Primary Examiner — Denise Tran
(74) Attorney, Agent, or Firm — Fogg & Powers LLC

(57) ABSTRACT

A cache system to compare memory transactions while facilitating checkpointing and rollback is provided. The system includes at least one processor core including at least one cache operating in write-through mode, at least two checkpoint caches operating in write-back mode, a comparison/checkpoint logic, and a main memory. The at least two checkpoint caches are communicatively coupled to the at least one cache operating in write-through mode. The comparison/checkpoint logic is communicatively coupled to the at least two checkpoint caches. The comparison/checkpoint logic compares memory transactions stored in the at least two checkpoint caches responsive to an initiation of a checkpointing. The main memory is communicatively coupled to at least one of the at least two checkpoint caches.

20 Claims, 3 Drawing Sheets

ARCHITECTURE AND METHOD FOR CACHE-BASED CHECKPOINTING AND ROLLBACK

CROSS-REFERENCE TO RELATED APPLICATION

This application is related to U.S. patent application Ser. No. 12/625,195, which is U.S. Pat. No. 8,108,721 having a title of "ARCHITECTURE AND METHOD FOR HARDWARE-ASSISTED PROCESSOR CHECKPOINTING AND ROLLBACK" (also referred to here as the "H0023441-5802 Application") which is filed on the same date herewith. The H0023441-5802 application is hereby incorporated herein by reference.

BACKGROUND

In order to provide fault tolerance for critical applications, computing systems often employ some form of checkpointing and rollback mechanism. Checkpointing and rollback enables the state of an application to be saved such that it can be restored back to the last known good state in the event of a failure. Space systems are one domain where radiation concerns can lead to high fault rates, especially when using commercial off the shelf (COTS) components.

One major limitation of checkpointing and rollback schemes is the overhead involved in logging memory transactions such that the system can be restored to a precise, known-good state. The exact state of main memory and secondary storage must be logged at each checkpoint, or all transactions must be journaled such that the state can be precisely restored in the event of a rollback. For embedded systems with limited memory and storage resources, traditional checkpointing schemes are outright prohibitive and have not traditionally been used.

SUMMARY

The present application relates to a cache system to compare memory transactions while facilitating checkpointing and rollback. The system includes at least one processor core including at least one cache operating in write-through mode, at least two checkpoint caches operating in write-back mode, a comparison/checkpoint logic, and a main memory. The at least two checkpoint caches are communicatively coupled to the at least one cache operating in write-through mode. The comparison/checkpoint logic is communicatively coupled to the at least two checkpoint caches. The comparison/checkpoint logic compares memory transactions stored in the at least two checkpoint caches responsive to an initiation of a checkpointing. The main memory is communicatively coupled to at least one of the at least two checkpoint caches.

DRAWINGS

DETAILED DESCRIPTION

Figure 1:
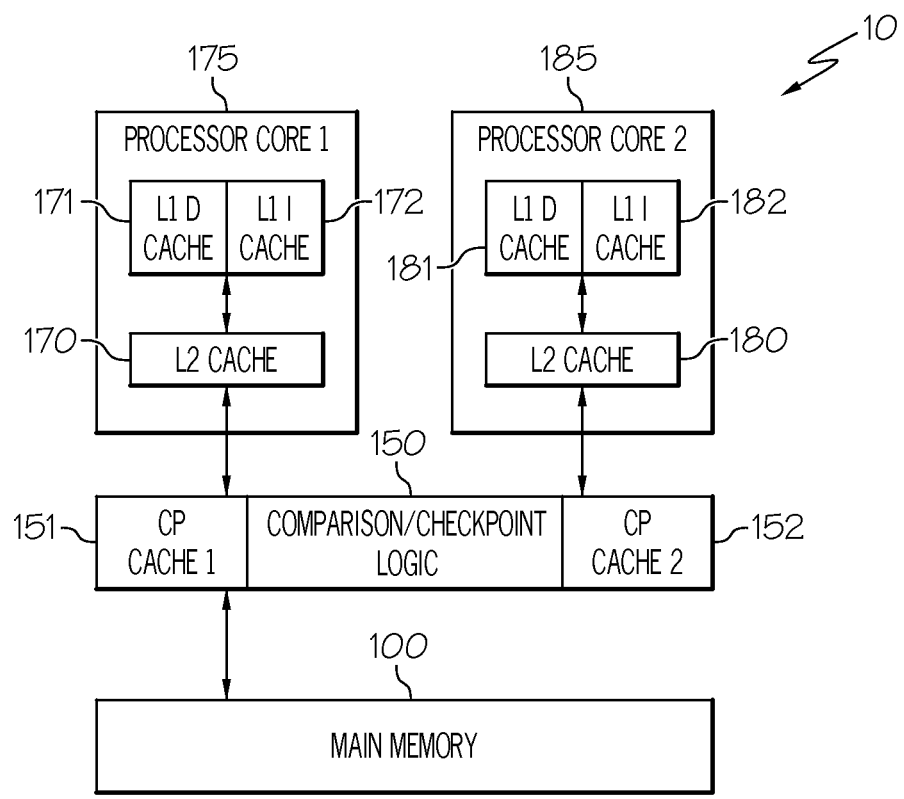
FIG. 1 is an embodiment of a cache system to ensure correctness of a memory and to facilitate checkpointing and rollback in accordance with the present invention.

The embodiments of the architectures of the cache systems described herein enable checkpointing and rollback schemes that provide extremely high fault tolerance and that are largely transparent to the user or the software developer. The embodiments of the cache architectures described herein use a cache as a memory log for checkpointing schemes. The cache-based mechanisms implement a virtual "log" of memory transactions, while also providing enhanced application performance. The checkpoint caches described herein serve as a buffer between a core processor complex and a main memory and operate to ensure that only valid, correct data is written to the main memory. When a cache line is to be written to back to memory, a comparison and checkpointing operation is initiated that ensures all data is correct before committing it to the main memory. This enables all memory logging to be handled using standard processor features, in a manner that is largely transparently to software.

The need for explicit transaction logs or memory access journals is eliminated, enabling checkpointing and recovery for resource-constrained embedded and space systems. In addition, the embodiments of the cache architectures described herein increase performance, efficiency, and fault tolerance for some check pointed commercial systems. The state of the processor cores is managed by software while the decisions of what to do (i.e., when to perform a checkpoint and rollback) is managed by caches in the cache systems described herein. These cache architectures permit fault tolerance in fast processors that are too fast to vote as is required in some conventional fault tolerance technologies.

The embodiments of the cache systems describe herein include at least one processor core including at least one primary cache that operates in write-through mode, at least two checkpoint caches that operate in write-back mode communicatively coupled to the at least one primary cache, a comparison/checkpoint logic communicatively coupled to the at least two checkpoint caches, and a main memory communicatively coupled to at least one of the checkpoint caches. The comparison/checkpoint logic compares memory transactions stored in the at least two checkpoint caches responsive to an initiation of a checkpointing operation and comparison sequence. In one implementation of this embodiment, the processor core includes one primary cache. In another implementation of this embodiment, the processor core includes more than one primary cache. In another implementation of this embodiment, the processor core includes primary caches and secondary caches. In yet another implementation of this embodiment, the processor core includes primary caches, secondary caches, and tertiary caches (the checkpoint caches).

For one example, the processor core includes a level 1 data cache, a level 1 instruction cache, and a level 2 cache communicatively coupled to the level 1 data cache and the level 1 instruction cache. The level 1 cache is referred to herein as the "primary cache." The level 2 cache is also referred to herein as the "secondary cache." Checkpoint caches are also referred to herein as "tertiary caches." In one implementation of this embodiment, the checkpoint caches are in the processor core. In another implementation of this embodiment, the checkpoint caches are external to the processor core. Other embodiments of the cache systems include variations on the cache architecture, such as, additional layers of caches or more caches at a given level (e.g., primary and secondary). As defined herein, the processor core is an independent processing element in a processor chip. In some embodiments, a processor chip includes multiple processor cores. The processor cores are also referred to here in as "processing elements."

FIG. 1 is an embodiment of a cache system 10 to ensure correctness of a memory and to facilitate checkpointing and rollback in accordance with the present invention. Cache system 10 includes a processor core 175, a processor core 185, checkpoint caches (CP caches) 151 and 152, comparison/checkpoint logic 150, and a main memory 100. Cache system 10 is also referred to herein as "system 10."

Processor core 175 includes L1D cache 171, L1I cache 172, and L2 cache 170. Processor core 185 includes L1D cache 181, L1I cache 182, and L2 cache 180. The L1D cache 171, L1I cache 172, L2 cache 170, L1D cache 181, L1I cache 182, and L2 cache 180 operate in write-through mode. The L1D cache 171, L1I cache 172, L1D cache 181, and L1I cache 182 are primary caches. Instructions go to L1I caches 172 and 182 and data goes to L1D caches 171 and 181. The L2 caches 170 and 180 are unified so instructions and data are stored there. The checkpoint caches 151 and 152 operate in write-back mode. In write back mode, changes to the cache are not reflected immediately. In write-through mode, some changes are reflected immediately.

As shown in FIG. 1, the checkpoint caches 151 and 152 and the comparison/checkpoint logic 150 are on a chip external to the processor cores 175 and 185. The checkpoint caches 151 and 152 are each communicatively coupled to the comparison/checkpoint logic 150. The separation between checkpoint caches 151 and 152 can be virtual or physical, as long as the cache system 10 maintains at least two copies of the checkpoint cache for comparison purposes. The checkpoint cache 151 is communicatively coupled to the L2 cache 170 on the processor core 175. The checkpoint cache 152 is communicatively coupled to the L2 cache 180 on the processor core 185. In this manner, each processor core 175 and 185 has access to a respective checkpoint cache 151 and 152. The main memory 100 is communicatively coupled to one of the checkpoint caches 151 or 152.

The processor core 175 and the processor core 185 form a self checking pair that provides fine control over checkpointing and rollback. The processor cores 175 and 185 run in lock step, each executing the same code block. As defined herein, a code block is a segment of code executed between any two sequential checkpoints.

The checkpoint cache 151 is positioned between the main memory 100 and the secondary caches (L2 cache 170) or the primary caches (L1D cache 171, L1I cache 172) if secondary cache is not present. Likewise the checkpoint cache 152 is positioned between the main memory 100 and the secondary caches (L2 cache 180) or the primary caches (L1D cache 181, L1I cache 182) if secondary cache is not present. Therefore the checkpoint caches 151 and 152 always have the most recent copy of any cached data. Dirty cache lines are only written back to main memory 100 after the preceding segment of executed code (code block) has been validated via a comparison of the spatial replication in checkpoint cache 151 and 152. The comparison is done by the comparison/checkpoint logic 150. As defined herein, a spatial replication in two or more checkpoint caches is a replication of the cache contents that are accrued simultaneously in the two or more checkpoint caches, which are spatially disparate (physically or virtually). As is known to one skilled in the art, dirty cache lines have changes that were made during the running of a program. The data stored in the caches can be different from data stored in main memory.

Since the checkpoint caches 151 and 152 operate in write-back mode and main memory 100 is not modified except during a checkpointing operation, the main memory 100 contains the data from the last checkpoint. The processing system state at the previous checkpoint can be exactly restored from the main memory 100.

If a checkpoint cache line must be written back to memory (most commonly, to replace it with another block of data), an interrupt is generated that signals the end of a code block. The interrupt signal initiates a checkpointing operation and a comparison sequence. The software portion of the checkpointing operation records the internal state of the processor in some external memory (not shown). In one implementation of this embodiment, the software portion of the checkpointing operation records the internal state of a processing element (not shown) that is communicatively coupled to the main memory in a bridge chip (not shown) as described in the related H0023441-5802 Application, which is incorporated herein by reference.

As part of the comparison sequence, the contents of the checkpoint caches for each processing element are compared. This comparison may be accomplished in any manner, including but not limited to checksum, cyclic redundancy check (CRC), one way hash function, or direct comparison. If cache contents of the first checkpoint cache and the second checkpoint cache agree, and if other state information agrees, all dirty cache lines are written back to main memory 100 as part of the checkpointing operation. The main memory 100 then contains a correct copy of the data at the new checkpoint. Any difference in the contents of the checkpoint cache 151 and the checkpoint cache 152 (as determined by the comparison/checkpoint logic 150) results in a full rollback. During a rollback, all dirty cache lines are invalidated.

In one implementation of this embodiment, the processor cores 175 and 185 are commercial-off-the-shelf (COTS) processors with the lowest-level of the cache configured as the checkpoint cache (for example, the L2 or L3 cache in currently available processors is the checkpoint cache). In another approach, the checkpoint cache is implemented with custom logic either on the same chip as the processor core(s) or on a companion chip. To minimize the number of checkpoints to force write backs to main memory, the checkpoint cache is as large and as highly set-associative as is practical for the cache system 10.

In the embodiment shown in FIG. 1, the processor cores 175 and 185 are on chips that include the L1D cache, the L1I cache, and the L2 cache. In one implementation of this embodiment, the processor cores 175 and 185 are on chips on which L1D cache and L1I cache and L2 cache controller are located and the L2 cache is on another chip. In another implementation of this embodiment, both processor cores 175 and 178 have a separate physical main memory. In yet another implementation of this embodiment, the comparison/checkpoint logic 150 and the checkpoint caches 151 and 152 and the comparison/checkpoint logic 150 are located on the same chip as the processor cores 175 and 185.

Figure 2:
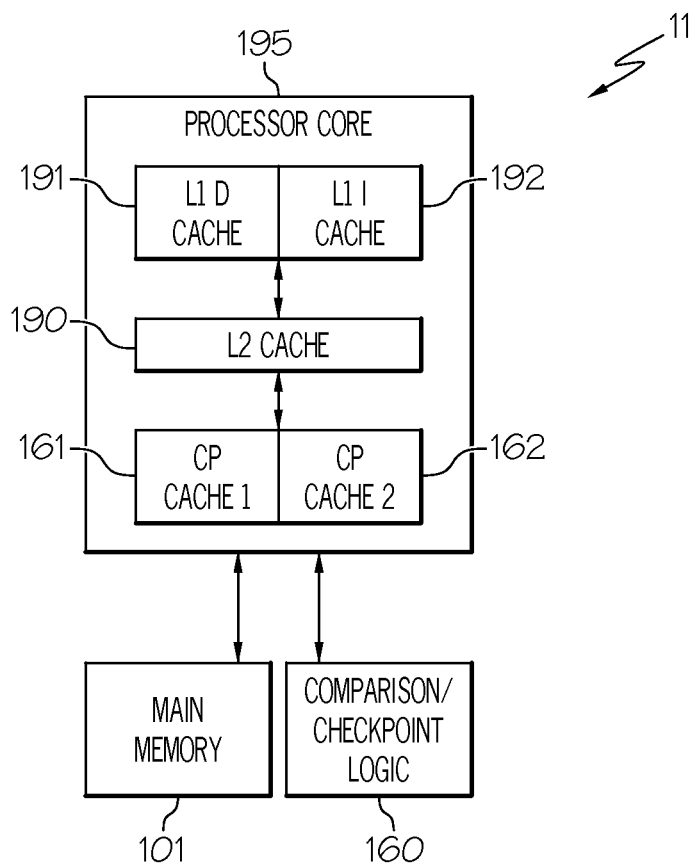
FIG. 2 is an embodiment of a cache system to ensure correctness of a memory and to facilitate checkpointing and rollback in accordance with the present invention.

FIG. 2 is an embodiment of a cache system 11 to ensure correctness of a memory and to facilitate checkpointing and rollback in accordance with the present invention. Cache system 11 includes a single processor core 195, comparison/checkpoint logic 160, and a main memory 101. Cache system 11 is also referred to herein as "system 11."

Processor core 195 includes an L1D cache 191, an L1I cache 192, an L2 cache 190, a first checkpoint cache 161, and a second checkpoint cache 162. The L1D cache 191 and L1I cache 192 are communicatively coupled to the L2 cache 190. The checkpoint cache 161 and checkpoint cache 162 are communicatively coupled to the L2 cache 190. The L1D cache 191 and L1I cache 192 operate in write-through mode and are primary caches. Instructions go to L1I cache 192 and data goes to L1D cache 191. The L2 cache 190 is unified so instructions and data are stored there. The L2 cache 190 operates in write-through mode and is a secondary cache. The first checkpoint cache 161 and the second checkpoint cache 162 operate in write-back mode. The separation between checkpoint caches 161 and 162 can be virtual or physical, as long as the cache system 11 maintains at least two copies of the checkpoint cache for comparison purposes.

The checkpoint caches 161 and 162 are each communicatively coupled to the comparison/checkpoint logic 160 and, in this embodiment, are off chip from comparison/checkpoint logic 160. At least one of the checkpoint caches 161 and 162 is communicatively coupled to the main memory 101.

The processor core 195 executes a code block at least twice to provide fine control over checkpointing and rollback. The active checkpoint cache is alternated between subsequent executions of the same code block.

The checkpoint caches 161 and 162 are positioned between the main memory 101 and the secondary cache (L2 cache 190). The checkpoint caches 161 and 162 are positioned between the main memory 101 and the primary caches (L1D cache 191, L1I cache 192) if secondary cache is not present. Therefore the checkpoint caches 161 and 162 always have the most recent copy of any cached data. Dirty cache lines are only written back to main memory 101 after the preceding segment of executed code (code block) has been validated via a comparison of the temporal replication in checkpoint caches 161 and 162. The comparison is done by the comparison/checkpoint logic 160. As defined herein, a temporal replication in two or more checkpoint caches is a replication of the cache contents that are accrued during two or more sequential executions of a data block, in which the output of each of the two or more sequential executions is stored in a separate one of the two or more checkpoint caches. The two or more checkpoint caches are spatially disparate (physically or virtually) and are written to at sequential times.

Since the checkpoint caches 161 and 162 operate in write-back mode and main memory 101 is not modified except during a checkpointing operation, the main memory 101 contains the data from the last checkpoint. The processing system state at the previous checkpoint can be exactly restored from the main memory 101.

If a cache line must be written back to main memory (most commonly, to replace it with another block of data), an interrupt is generated that signals the end of the second execution of the code block, initiating a checkpointing operation and a comparison sequence.

As part of the comparison sequence, the contents of the checkpoint caches 161 and 162 are compared after a code block is executed twice while the active checkpoint cache is alternated between the two executions of the same code block. For example, after the first execution of the code block, the memory transactions are written to the first checkpoint cache 161 and after the second execution of the code block, the memory transactions are written to the second checkpoint cache 162. This action allows all of the processor's state, including memory accesses, to be compared after the code block is executed twice. If cache contents of the first checkpoint cache 161 and second checkpoint cache 162 agree, and if other state information agree, all dirty cache lines are written back to main memory 101 as part of the checkpointing operation. The main memory 101 then contains a correct copy of the data at the new checkpoint. Any difference in the contents of the checkpoint cache 161 and the checkpoint cache 162 (as determined by the comparison/checkpoint logic 160) results in a full rollback. During a rollback, all dirty cache lines are invalidated.

The separation between checkpoint caches can be virtual or physical, as long as the processing element maintains at least two copies of the checkpoint cache for comparison purposes. Cache system 11 provides temporal replication of the code blocks and has the advantage of only requiring one processor core 195 (as opposed to the spatial replication described above with reference to cache system 10 in FIG. 1).

In one implementation of this embodiment, the processor core 195 is a commercial-off-the-shelf (COTS) processor with the lowest-level of the cache configured as the checkpoint cache. In another implementation of this embodiment, the processor core 195 is a single chip on which L1D cache 191, L1I cache 192, and L2 cache controller are located on one chip while the L2 cache 190, the first checkpoint cache 161 and the second checkpoint cache 162 are located on another chip. In yet another implementation of this embodiment, the comparison/checkpoint logic 160 is located on the same chip as the first checkpoint cache 161 and the second checkpoint cache 162. To minimize the number of checkpoints to force write backs to memory, the checkpoint cache is as large and as highly set-associative as is practical for the cache system 11.

Figure 3:
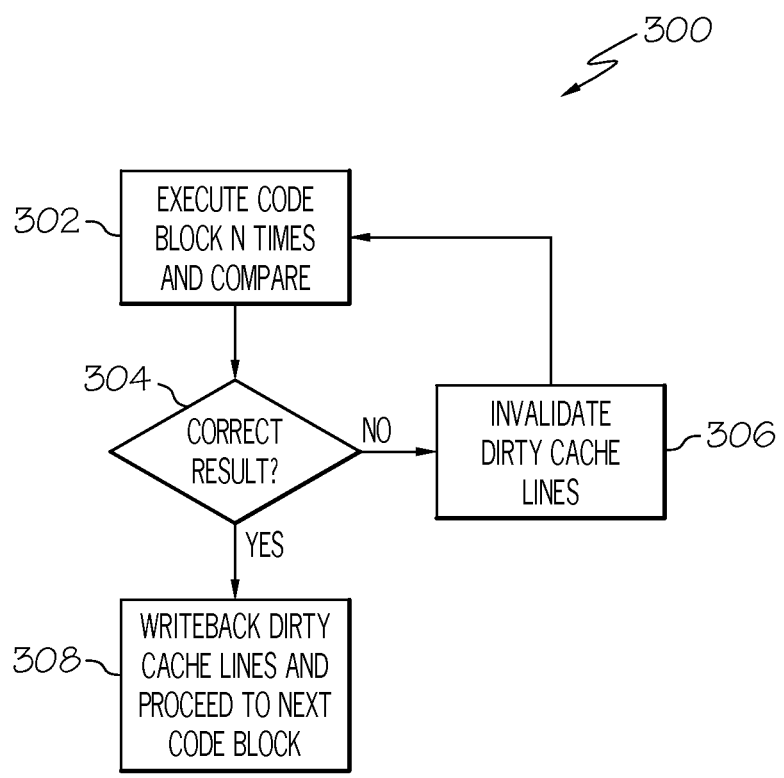
FIG. 3 is an embodiment of a method of implementing a cache system to ensure correctness of a memory and to facilitate checkpointing and rollback in accordance with the present invention.

FIG. 3 is an embodiment of a method 300 of implementing a cache system to ensure correctness of a memory and to facilitate checkpointing and rollback in accordance with the present invention. Method 300 is applicable to the cache system 10 of FIG. 1, the cache system 11 of FIG. 2, and other embodiments of the cache systems. At block 302, a code block is executed N times and the output of the primary and/or secondary caches is compared at a comparison/checkpoint logic. As defined herein, N is a positive integer (N>1).

When method 300 is implemented on cache system 10, a single code block is simultaneously executed by the processor cores 175 and 185. Data from the processor cores 175 and 185 is simultaneously stored in the first checkpoint cache 151 and the second checkpoint cache 152, respectively.

When method 300 is implemented on cache system 11, each code block is executed twice. An interrupt signal is received at the end of a first execution of a code block and the memory transactions from the first execution of the code block are stored in the first checkpoint cache 161. Then the code block is re-executed and an interrupt signal is received at the end of the second execution of the code block. The memory transactions from the second execution of the code block are stored in the second checkpoint cache 162.

In some embodiments, the code block is executed multiple times before the comparison results in a match. In this case, the dirty cache lines are invalidated with each mismatch of the checkpoint caches and the code block is re-executed until a match is obtained.

Once the code block is executed one or two times (for cache system 10 or cache system 11, respectively) and data from at least one processor core in stored the first and second checkpoint caches, a checkpointing operation is initiated.

At block 304, the memory transactions stored in the first checkpoint cache are compared with memory transactions stored in the second checkpoint cache during a comparison sequence. The comparison/checkpoint logic communicatively coupled to the first checkpoint cache and the second checkpoint cache makes the comparison responsive to the initiation of the comparison sequence. A comparison sequence is initiated at comparison/checkpoint logic responsive to the initiating of the checkpointing operation. This checkpointing operation can be triggered by an externally generated interrupt signal or it can be triggered by a software layer that is responsible for the timing of code blocks.

When method 300 is implemented on cache system 10, the comparison sequence at the comparison/checkpoint logic is a comparison of a spatial replication of memory transactions in the two checkpoint caches 151 and 152 after a single execution of a code block. In this case, the first processor core 175 and the second processor core 185 are executed in lock step with each other.

When method 300 is implemented on cache system 11, the comparison sequence at the comparison/checkpoint logic is a comparison of a temporal replication of memory transactions after two executions of a code block.

If the comparison at the comparison/checkpoint logic results in a mismatch between the memory transactions at the first checkpoint cache and the second checkpoint cache, the flow proceeds to block 306. At block 306, the dirty cache lines are invalidated and a rollback (full rollback) is initiated for the processor cores in the cache system. This rollback is triggered by the comparison/checkpoint logic when a mismatch is detected.

If the comparison at the comparison/checkpoint logic results in a match between the memory transactions at the first checkpoint cache and the second checkpoint cache, the flow proceeds to block 308. At block 308, the checkpoint cache writes back data to the main memory.

Thus, the systems described herein provide a way to look at what is going on in the processor core(s) based on: 1) what instructions the processor core(s) is receiving; 2) what data the processor core(s) is receiving; and 3) what output the processor core(s) is producing. All data traffic flows through the memory interface, i.e., the checkpoint caches between the L2 caches and the main memory. After a code block is executed one or two times at two or one processor core(s), respectively, the cache system checks to see that all the cache accesses have been the same. The checkpoint caches look at all cache traffic since the last code block was executed and store all the traffic. The comparison/checkpoint logic does a comparison (on the fly) between the checkpoint caches. Each of the checkpoint caches flow data input to the comparison/checkpoint logic at the same time. Any changes to main memory that are a result of the computations are also cached in the checkpoint caches.

After a checkpointing operation is implemented and a match is obtained during a comparison sequence, the stored data is sent to the main memory from one of the checkpoint caches. If there is a mismatch between the checkpoint cache and checkpoint cache, the comparison/checkpoint logic interrupts the write back and initiates a rollback to the previous checkpoint. If this occurs, the dirty cache lines are invalidated. If a rollback to the previous state is required, due to a mismatch, data from the main memory refills all cache lines with what the correct values from the last successful checkpointing operation. The states are only memory locations. During the rollback, the software rollback puts the processor core back to a particular execution point as is known to those skilled in the art. In this manner, all the data and transactions go thru checkpoint cache before going to the main memory in order to stay coherent and the transactions are visible. The memory, I/O (bus transactions) all go thru checkpoint cache at the same time (or with fixed offset).

Although specific embodiments have been illustrated and described herein, it will be appreciated by those skilled in the art that any arrangement, which is calculated to achieve the same purpose, may be substituted for the specific embodiment shown. This application is intended to cover any adaptations or variations of the present invention. Therefore, it is manifestly intended that this invention be limited only by the claims and the equivalents thereof.

What is claimed is:

1. A cache system to compare memory transactions while facilitating checkpointing and rollback, the system comprising:
    at least two processor cores each including at least one cache operating in write-through mode;
    at least two checkpoint caches operating in write-back mode and communicatively coupled to respective ones of the at least two cache operating in write-through mode in the at least two processor cores;
    a comparison/checkpoint logic communicatively coupled to the at least two checkpoint caches, wherein the comparison/checkpoint logic compares memory transactions stored in the at least two checkpoint caches responsive to an initiation of a checkpointing; and
    a main memory communicatively coupled to at least one of the at least two checkpoint caches, wherein, if the memory transactions stored in the at least two checkpoint caches match, the checkpoint cache communicatively coupled to the main memory writes back all dirty cache lines to the main memory, and
    wherein, if memory transactions stored in the at least two checkpoint caches do not match, a rollback is initiated for the at least two processor cores and all dirty cache lines are invalidated.

2. The system of claim 1, wherein each at least one processor core includes:
    a level 1 data cache;
    a level 1 instruction cache; and
    a level 2 cache communicatively coupled to the level 1 data cache and the level 1 instruction cache.

3. The system of claim 1, wherein the at least two checkpoint caches include two checkpoint caches, wherein the at least two processor cores include two processor cores, and wherein the two checkpoint caches provide a spatial replication of memory transactions for comparison by the comparison/checkpoint logic.

4. The system of claim 3, wherein the two processor cores are executed in lock step with each other.

5. The system of claim 1, wherein the at least two processor cores include two processor cores that execute a code block at least twice, wherein the at least two checkpoint caches include two checkpoint caches that are alternately activated between subsequent execution runs of the code block, and wherein the two checkpoint caches provide a temporal replication of memory transactions for comparison by the comparison/checkpoint logic after two executions of the code block.

6. The system of claim 5, wherein the two checkpoint caches are virtual checkpoint caches maintaining at least two copies of the checkpoint cache.

7. The system of claim 5, wherein the two checkpoint caches are two physical checkpoint caches each maintaining a copy of the checkpoint cache.

8. The system of claim 1, wherein a separation between the at least two checkpoint caches is a virtual separation.

9. The system of claim 1, wherein the at least two checkpoint caches are physically separated.

10. A method of ensuring correctness of a main memory while facilitating checkpointing and rollback, the method comprising:
    storing data from at least one processor core in a first checkpoint cache and a second checkpoint cache;
    receiving an interrupt signal at the end of a first execution of a code block;

storing memory transactions in the first checkpoint cache;
re-executing the code block;
receiving an interrupt signal at the end of a second execution of the code block;
storing memory transactions in the second checkpoint cache;
initiating a checkpointing operation responsive to the interrupt signal received at the end of the second execution of the code block;
initiating a comparison sequence at the comparison/checkpoint logic responsive to the initiating of the checkpointing operation;
comparing the memory transactions stored in the first checkpoint cache with the memory transactions stored in the second checkpoint cache at a comparison/checkpoint logic communicatively coupled to the first checkpoint cache and the second checkpoint cache responsive to initiating the comparison sequence; and
writing back data in the main memory when the memory transactions stored in the first checkpoint cache and the second checkpoint cache match.

11. The method of claim 10, wherein writing back data in the main memory comprises writing back dirty cache lines to the main memory, the method further comprising:
invalidating the dirty cache lines when the memory transactions stored in the first checkpoint cache mismatch the memory transactions stored in the second checkpoint cache.

12. The method of claim 10, wherein the at least one processor core is a first processor core communicatively coupled to the first checkpoint cache and a second processor core communicatively coupled to the second checkpoint cache, wherein initiating a comparison sequence at the comparison/checkpoint logic comprises comparing a spatial replication of memory transactions.

13. The method of claim 12, the method further comprising executing the first processor core and the second processor core in lock step.

14. The method of claim 10, wherein the at least one processor core is a single processor core communicatively coupled to the two checkpoint caches, wherein initiating a comparison sequence at the comparison/checkpoint logic comprises comparing a temporal replication of memory transactions after two executions of a code block.

15. The method of claim 10, further comprising initiating a rollback when the memory transactions stored in the first checkpoint cache mismatch the memory transactions stored in the second checkpoint cache.

16. A cache system to compare memory transactions while facilitating checkpointing and rollback, the system comprising:
a first processor core including at least one first cache operating in write-through mode;
a second processor core including at least one second cache operating in write-through mode;
a first checkpoint cache operating in write-back mode and communicatively coupled to the at least one first cache operating in write-through mode;
a second checkpoint cache operating in write-back mode and communicatively coupled to the at least one second cache operating in write-through mode;
a comparison/checkpoint logic communicatively coupled to the first checkpoint cache and the second checkpoint cache, wherein the comparison/checkpoint logic compares memory transactions stored in the first and second checkpoint caches responsive to an initiation of a checkpointing; and
a main memory communicatively coupled to at least one of the first checkpoint cache and the second checkpoint cache, wherein, if the memory transactions stored in the first checkpoint cache match the memory transactions stored in the second checkpoint cache, the checkpoint cache communicatively coupled to the main memory writes back all dirty cache lines to the main memory, and
wherein, if the memory transactions stored in the first checkpoint cache do not match the memory transactions stored in the second checkpoint cache, a rollback is initiated for the first processor core and the second processor core and all dirty cache lines are invalidated.

17. The system of claim 16, wherein the first processor core is executed in lock step with the second processor core.

18. The system of claim 16, wherein the first processor core and the second processor core each execute a code block at least twice, wherein the first checkpoint cache and the second checkpoint cache are alternately activated between subsequent execution runs of the code block, and wherein the first checkpoint cache and the second checkpoint cache provide a temporal replication of memory transactions for comparison by the comparison/checkpoint logic after two executions of the code block.

19. The system of claim 16, wherein the first checkpoint cache and second checkpoint cache provide a spatial replication of memory transactions for comparison by the comparison/checkpoint logic.

20. The system of claim 16, wherein the two checkpoint caches are two physical checkpoint caches each maintaining a copy of the checkpoint cache.

* * * * *